United States Patent [19]

Lesher et al.

[11] 3,869,464

[45] Mar. 4, 1975

[54] PREPARATION OF 1-ALKYL-1,4-DIHYDRO-7-SUBSTITUTED-4-OXO-1,8-NAPHTHYRIDINE-3-CARBOXYLIC ACIDS VIA THE 3-HYDROXYMETHYL ANALOGS

[75] Inventors: George Y. Lesher, Schodack; Monte D. Gruett, East Greenbush, both of N.Y.

[73] Assignee: Sterling Drug Inc., New York, N.Y.

[22] Filed: Feb. 26, 1973

[21] Appl. No.: 335,734

[52] U.S. Cl.... 260/295.5 B, 260/295 R, 260/295 N, 260/296 N
[51] Int. Cl............................................. C07d 31/36
[58] Field of Search...... 260/295.5 B, 295 N, 296 N

[56]      References Cited
         UNITED STATES PATENTS
3,149,104   9/1964   Lesher et al. ................ 260/295.5 B
3,225,055   12/1965  Lesher et al. ................ 260/295.5 B OTHER PUBLICATIONS
Urbanski, J. Chem. Soc., London, pp. 132–134, (1947), QD1 C.6.
Klingsberg, Pyridine and Its Derivatives, part 3, Interscience Pub., pp. 182–191, (1962), QD 401 K5 C.2.

*Primary Examiner*—Alan L. Rotman
*Attorney, Agent, or Firm*—Robert K. Bair; B. Woodrow Wyatt

[57]       ABSTRACT
Process of reacting 1,4-dihydro-4-oxo-7-Q-1,8-naphthyridine (I) with a hydroxymethylating agent to produce 1,4-dihydro-3-hydroxymethyl-4-oxo-7-Q-1,8-naphthyridine II, reacting II with a lower-alkylating agent to produce 1-(lower-al-)-1,4-dihydro-3-hydroxymethyl-4-oxo-7-Q-1,8-naphthyridine (III), and oxidizing III to produce 1-(lower-alkyl)-1,4-dihydro-4-oxo-7-Q-1,8-naphthyridine-3-carboxylic acid (IV), where Q is lower-alkyl, lower-alkanoyloxymethyl, 4(or 3)-pyridyl or 4(or 3)-pyridyl having one or two lower-alkyl substituents. The final products (IV) are known antibacterial agents, as are the corresponding 7-hydroxymethyl compounds which are prepared by hydrolysis of the final products where Q is 7-(lower-alkanoyloxymethyl). A further process comprises reacting 1,4-dihydro-7-methyl-4-oxo-1,8-naphthyridine-8-oxide (V) with a hydroxymethylating agent to produce -dihydro-3-hydroxymethyl-7-methyl-4-oxo-1,8-naphthyridine-8-oxide (VI) and oxidizing VI to produce 3-carboxy-1,4-dihydro-7-methyl-4-oxo-1,8-naphthyridine-8-oxide (VII). The 8-oxide (VII) is converted in three steps via the 7-(lower-alkanoyloxymethyl) compound to 1-ethyl-1,4-dihydro-7-hydroxymethyl-4-oxo-1,8-naphthyridine-3-carboxylic acid.

12 Claims, No Drawings

PREPARATION OF 1-ALKYL-1,4-DIHYDRO-7-SUBSTITUTED-4-OXO-1,8-NAPHTHYRIDINE-3-CARBOXYLIC ACIDS VIA THE -3HYDROXYMETHYL ANALOGS PROCESS AND INTERMEDIATES

This invention relates to steps in the process of preparing 1,8-naphthyridine-3-carboxylic acids and to compositions used therein.

The invention in a process aspect comprises the combination of the three steps of reacting 1,4-dihydro-4-oxo-7-Q-1,8-naphthyridine (I), which is tautomeric with 4-hydroxy-7-Q-1,8-naphthyridine (IA), with a hydroxymethylating agent to produce 1,4-dihydro-3-hydroxymethyl-4-oxo-7-Q-1,8-naphthyridine (II), which is tautomeric with 4-hydroxy-3-hydroxymethyl-7-Q-1,8-naphthyridine (IIA), reacting II (or IIA) with a lower-alkylating agent to produce 1-(lower-alkyl)-1,4-dihydro-3-hydroxymethyl-4-oxo-7-Q-1,8-naphthyridine (III), and reacting III with an oxidizing agent capable of converting —CH$_2$OH to —COOH to produce 1-(lower-alkyl)-1,4-dihydro-4-oxo-7-Q-1,8-naphthyridine-3-carboxylic acid (IV), where Q is lower-alkyl, lower-alkanoyloxymethyl, 4(or 3)-pyridyl or 4(or 3)-pyridyl having one or two lower-alkyl substituents. The final products (IV) are known antibacterial agents, as are the corresponding 7-hydroxymethyl compounds which are prepared by hydrolysis of the final products where Q is lower-alkanoyloxymethyl. In addition to said combination of the three steps, other process aspects of the invention are each individual step and the two consecutive combinations of two steps.

The invention in its composition aspect resides in the compounds: 1,4-dihydro-3-hydroxymethyl-4-oxo-7-Q-1,8-naphthyridine and its tautomeric 4-hydroxy-3-hydroxymethyl-7Q-1,8-naphthyridine of the respective formulas II and IIA

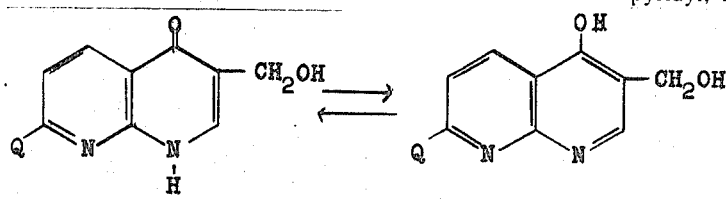

and 1-(lower-alkyl)-1,4-dihydro-3-hydroxymethyl-4-oxo-7-Q-1,8-naphthyridine of formula III

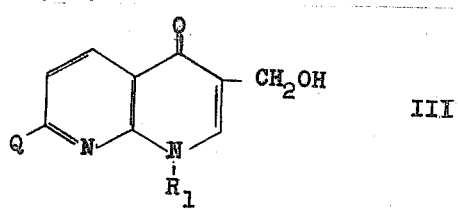

where R$_1$ is lower-alkyl and Q in each of the formulas II, IIA and III is defined as hereinabove.

Another process aspect of the invention comprises the two-step combination as well as the individual steps of reacting 1,4-dihydro-7-methyl-4-oxo-1,8-naphthyridine-8-oxide (V), which is tautomeric with 4-hydroxy-7-methyl-1,8-naphthyridine-8-oxide (V), with a hydroxymethylating agent to produce 1,4-dihydro-3-hydroxymethyl-7-methyl-4-oxo-1,8-naphthyridine-8-oxide (VI), which is tautomeric with 4-hydroxy-3-hydroxymethyl-7-methyl-1,8-naphthyridine-8-oxide (VIA), and reacting VI (or VIA) with an oxidizing agent capable of converting —CH$_2$OH to —COOH to produce 3-carboxy-1,4-dihydro-7-methyl-4-oxo-1,8-naphthyridine-8-oxide (VII), which is tautomeric with 3-carboxy-4-hydroxy-7-methyl-1,8-naphthyridine-8-oxide (VIIA). The 8-oxide (VII or VIIA) is then converted by known means to produce 1-ethyl-1,4-dihydro-7-hydroxymethyl-4-oxo-1,8-naphthyridine-3-carboxylic acid by first reacting it (or its lower-alkyl ester) with a lower-alkanoic acid anhydride to produce 7-(lower-alkanoyloxymethyl)-1,4-dihydro-4-oxo-1,8-naphthyridine-3-carboxylic acid (or its lower-alkyl ester), ethylating the latter to produce 7-(lower-alkanoyloxymethyl)-1-ethyl-1,4-dihydro-4-oxo-1,8-naphthyridine-3-carboxylic acid (or its lower-alkyl ester) and heating the latter with aqueous alkali metal hydroxide solution to produce said corresponding 7-hydroxymethyl-1,8-naphthyridine-3-carboxylic acid.

The term "lower-alkyl", as used herein, e.g., as represented by R$_1$ in formula III or as a substituent of 4(or 3)-pyridyl when represented by Q in formulas II, IIA or III, means alkyl radicals having from 1 to 6 carbon atoms which can be arranged as straight or branched chains, illustrated by methyl, ethyl, n-propyl, isopropyl, n-butyl, sec-butyl, isobutyl, n-amyl, n-hexyl, and the like.

The term "lower-alkanoyl", as used herein, e.g., in the definition of the Q substituent as lower-alkanoyloxymethyl in formulas II, IIA or III, means alkanoyl radicals having from one to six carbon atoms, including the straight- and branched-chain radicals, illustrated by formyl, acetyl, propionyl (propanoyl), butyryl (butanoyl), isobutyryl (2-methylpropanoyl) and caproyl (hexanoyl).

Illustrative of the Q substituent in formulas III, IV, IVA, and V where Q is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2-isopropyl-4-pyridyl, 2-n-butyl-4-pyridyl, 2-n-hexyl-4-pyridyl, 2,6-diethyl-4-pyridyl, 2,6-diethyl-3-pyridyl, 2,6-diisopropyl-4-pyridyl, 2,6-di-n-hexyl-4-pyridyl, and the like. Because of ready availability, ease of preparation and/or high antibacterial activity of the final products, i.e., the 1-(lower-alkyl)-1,4-dihydro-7-[mono(or di)-(lower-alkyl)-4(or 3)-pyridyl]-4-oxo-1,8-naphthyridine-3-carboxylic acids, preferred embodiments of this group are those where 4(or 3)-pyridyl is substituted by one or two methyls, especially the 2-methyl-4-pyridyl and 2,6-dimethyl-4-pyridyl compounds. Other preferred embodiments are those having unsubstituted-4(or 3)-pyridyl as Q.

As shown above, 1,4-dihydro-3-hydroxymethyl-7-Q-4-1,8-naphthyridine of formula II is tautomeric with 4-hydroxy-3-hydroxymethyl-7-Q-1,8-naphthyridine of formula IIA. As with all tautomeric systems, the rate of the transformation II $\rightleftarrows$ IIA and the ratio II/IIA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as II and the names of the compounds herein therefore are preferably based on structure II, although it is understood that either or both structures are comprehended.

The intermediate 1,4-dihydro-4-oxo-7-Q-1,8-naphthyridines (I) or tautomers (IA) are either known or, where novel, are prepared from known compounds by methods illustrated hereinbelow. One such method, which is disclosed and claimed in copending application Ser. No. 335,733, filed Feb. 26, 1973, comprises the steps of reacting cyclic alkylidenyl N-(6-Q-2-pyridyl)aminomethylenemalonate, where Q is lower-alkyl, 4(or 3)-pyridyl, or 4(or 3)-pyridyl having one or two lower-alkyl substituents, with an oxidizing agent capable of converting pyridines to pyridine-N-oxides to produce cyclic alkylidenyl N-(6-Q'-1-oxo-2-pyridyl)aminomethylenemalonate, where Q' is lower-alkyl, 1-oxo-4-(or 3)-pyridyl or 1-oxo-4(or 3)-pyridyl having one or two lower-alkyl substituents, heating said 6-Q'-1-oxo-2-pyridyl compound to produce 1,4-dihydro-4-oxo-7-Q'-1,8-naphthyridine-8-oxide and then converting said 8-oxide to the corresponding 1,4-dihydro-4-oxo-7-Q-1,8-naphthyridine. Illustrations of this method are given below in Examples 64–110.

The molecular structures of the composition aspects (II, IIA and III) of our invention were assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The reaction of 1,4-dihydro-4-oxo-7-Q-1,8-naphthyridine (I) or its tautomeric 4-hydroxy-7-Q-1,8-naphthyridine (IA) with a hydroxymethylating agent to produce 1,4-dihydro-3-hydroxymethyl-4-oxo-7-Q-1,8-naphthyridine (II) or its tautomeric 4-hydroxy-3-hydroxymethyl-7-Q-1,8-naphthyridine (IIA) is carried out preferably by reacting I (or IA) with aqueous formaldehyde under alkaline conditions.

The reaction of 1,4-dihydro-3-hydroxymethyl-4-oxo-7-1,8-naphthyridine (II) or its tautomeric 4-hydroxy-3-hydroxymethyl-7-Q-1,8-naphthyridine (IIA) with a lower-alkylating agent to product 1-(lower-alkyl)-1,4-dihydro-3-hydroxymethyl-4-oxo-7-Q-1,8-naphthyridine (III) is generally carried out by reacting said compound of formula II or IIA with a lower-alkyl ester of a strong inorganic acid or an organic sulfonic acid, said ester having the formula $R_1$-An, where An is an anion of a strong inorganic acid or an organic sulfonic acid, e.g., chloride, bromide, iodide, sulfate, methanesulfonate, benzenesulfonate, and para-toluenesulfonate, and $R_1$ is lower-alkyl. This alkylation is preferably run using a slight excess of the alkylating agent although equimolar quantities give satisfactory results. The chloride, bromide or iodide is preferred because of the ready availability of the requisite lower-alkyl halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction is preferably carried out in the presence of a suitable solvent which is inert under the reaction conditions, e.g., a solvent such as lower-alkanol, acetone, dioxane, dimethylformamide, dimethyl sulfoxide, hexamethyl phosphoramide, or a mixture of solvents, e.g., a mixture of water and a lower-alkanol. The reaction is generally carried out at a temperature between about room temperature (about 20°–25°C.) and 150°C., preferably heating on a steam bath in a stirred mixture of dimethylformamide and anhydrous potassium carbonate.

The reaction of 1-(lower-alkyl)-1,4-dihydro-3-hydroxymethyl-4-oxo-7-Q-1,8-naphthyridine (III) with an oxidizing agent to produce 1-(lower-alkyl)-1,4-dihydro-4-oxo-7-Q-1,8-naphthyridine-3-carboxylic acid (IV) is generally carried out by reacting III with an oxidizing agent capable of converting hydroxymethyl to carboxy. Such oxidizing agents are, for example, an alkali permanganate, e.g., $KMnO_4$, an alkali dichromate, e.g., $Na_2Cr_2O_7$, nitric acid, and the like. The reaction conditions vary and are dependent upon the particular oxidizing agent used. For example, oxidation with potassium permanganate is conveniently run at low temperature, preferably below 20°C., in a basic medium, preferably in pyridine which also acts as solvent or in aqueous sodium or potassium hydroxide solution; two to three moles of potassium permanganate per mole of the 3-hydroxymethyl compound are preferably used. Oxidation using dichromate is conveniently run in an aqueous acidic medium preferably using, for example, per mole of sodium dichromate three moles of the 3-hydroxymethyl compound in about four moles of sulfuric acid; the reaction temperature is kept preferably no higher than about 20°C. during addition of the dichromate salt in water to the hydroxymethyl compound in sulfuric acid (sp. gr. 1.84) and then allowing it to rise to about 35°–50°C. to accelerate the reaction. Oxidation with concentrated nitric acid (sp. gr. 1.42) is conveniently run by slowly adding in small portions the 4-hydroxymethyl compound to a four to six molar excess of the nitric acid kept between about 20°–30°C. during the addition, and then preferably allowing the reaction mixture to stand at room temperature (about 20°–25°C.) overnight, i.e., about 15–16 hours, and then heating it for about 1 hour on a steam bath.

The best mode contemplated for carrying out the invention is now set forth as follows:

EXAMPLE 1

1,4-Dihydro-3-hydroxymethyl-7-methyl-4-oxo-1,8-naphthyridine

To a solution containing 1.6 g. of 1,4-dihydro-7-methyl-4-oxo-1,8-naphthyridine (tautomeric with 4-hydroxy-7-methyl-1,8-naphthyridine), 5.5 ml. of 2N aqueous potassium hydroxide solution and 10 ml. of water was added with stirring 0.8 ml. of formaldehyde (35–40%) and the resulting reaction mixture was heated on a steam bath for 2½ hours. After standing at room temperature (about 20°–25°C.) overnight (about 18 hours), the reaction mixture was filtered and the filtrate was cooled in an ice bath. The resulting precipitate was collected, washed with water, dried and found to have a melting point greater than 300°C. The solid product was recrystallized from 10 ml. of dimethylformamide using decolorizing charcoal, washed with ether, dried in vacuo at 70°C. to yield 0.6 g. 1,4-dihydro-3-hydroxymethyl-7-methyl-4-oxo-1,8-naphthyridine, which is tautomeric with 4-hydroxy-3-hydroxymethyl-7-methyl-1,8-naphthyridine.

EXAMPLE 2

1-Ethyl-1,4-dihydro-3-hydroxymethyl-7-methyl-4-oxo-1,8-naphthyridine

To a stirred suspension heated on a steam bath and containing 3.8 g. of 1,4-dihydro-3-hydroxymethyl-7-methyl-4-oxo-1,8-naphthyridine in 30 ml. of dimethylformamide is added 8.3 g. of anhydrous potassium carbonate and the mixture is stirred for about fifteen minutes. To the stirred hot mixture is added 3.8 g. of ethyl iodide and the resulting mixture is stirred with heating on the steam bath for ninety minutes. The hot reaction mixture is filtered and the filtrate chilled. The resulting crystalline precipitate is collected, triturated with warm water, washed sparingly with warm water and dried in vacuo at 60°C. to yield 1-ethyl-1,4-dihydro-3-hydroxymethyl-7-methyl-4-oxo-1,8-naphthyridine. If desired, this compound can be re-crystallized from dimethylformamide.

EXAMPLE 3

1-Ethyl-1,4-dihydro-7-methyl-4-oxo-1,8-naphthyridine-3-carboxylic acid

A suspension of 2.2 g. of 1-ethyl-1,4-dihydro-3-hydroxymethyl-7-methyl-4-oxo-1,8-naphthyridine in 25 ml. of pyridine and 5 ml. of water is stirred and cooled to 10°C. in an ice bath. Solid potassium permanganate (5 g.) is added in small portions over the course of about 55 minutes. The temperature is not allowed to rise above 15°C. and small amounts of water totalling 25 ml. is added during the course of the addition. The resulting mixture is stirred about 30 minutes longer at 10°–20°C. and then filtered through infusorial earth. The cake of collected manganese dioxide is washed with a little water and the combined filtrates are treated with saturated aqueous sodium bisulfite solution until the excess permanganate is destroyed. The pale yellow solution is then acidified with excess 6N hydrochloric acid. After cooling in ice, the precipitated solid is collected by vacuum, rinsed with fresh water and sucked as dry as possible. The material is recrystallized from 12 ml. of dimethylformamide and dried for 18 hours in a vacuum oven (80°C.). There is obtained, as pale yellow crystals, 1-ethyl-1,4-dihydro-7-methyl-4-oxo-1,8-naphthyridine-3-carboxylic acid, m.p. 232°–234°C. A mixed melting point with authentic material is undepressed.

The above oxidation also is carried out by slowly adding with stirring a solution of 3.2 g. of sodium dichromate in 2.0 ml. of water to 7.06 g. of 1-ethyl-1,4-dihydro-3-hydroxymethyl-7-methyl-4-oxo-1,8-naphthyridine in 2.4 ml. of sulfuric acid (sp. gr. 1.84) and 2.4 ml. of water, keeping the reaction temperature below 20°C. Stirring of the reaction mixture is continued while allowing the reaction temperature to rise to 35°C. The reaction mixture is diluted with an equal volume of water; the resulting mixture is chilled in an ice bath; and, the resulting precipitate is collected, washed with water, dried and recrystallized from dimethylformamide to yield 1-ethyl-1,4-dihydro-7-methyl-4-oxo-1,8-naphthyridine-3-carboxylic acid.

This oxidation also is run as follows: To 6.20 ml. of concentrated nitric acid (sp. gr. 1.42) kept between 20°–30°C. is slowly added in portions with stirring 4.4 g. of 1-ethyl-1,4-dihydro-3-hydroxymethyl-7-methyl-4-oxo-1,8-naphthyridine. The reaction mixture is then allowed to stand at room temperature (20°–25°C.) for about 16 hours and is next heated on a steam bath for 1 hour. The hot reaction mixture is diluted with an equal volume of hot water and the resulting mixture is chilled in an ice bath. The resulting precipitate is collected, washed with water, dried and recrystallizd from dimethylformamide to yield 1-ethyl-1,4-dihydro-7-methyl-4-oxo-1,8-naphthyridine-3-carboxylic acid.

Following the procedure described in Example 1 but using in place of 1,4-dihydro-7-methyl-4-oxo-1,8-naphthyridine a molar equivalent quantity of the appropriate 1,4-dihydro-4-oxo-7-Q-1,8-naphthyridine, the compounds of Examples 4-19 are obtained:

EXAMPLE 4

7-Ethyl-1,4-dihydro-3-hydroxymethyl-4-oxo-1,8-naphthyridine using 7-ethyl-1,4-dihydro-4-oxo-1,8-naphthyridine.

EXAMPLE 5

1,4-Dihydro-3-hydroxymethyl-4-oxo-7-n-propyl-1,8-naphthyridine using 1,4-dihydro-4-oxo-7-n-propyl-1,8-naphthyridine.

EXAMPLE 6

1,4-Dihydro-3-hydroxymethyl-7-isobutyl-4-oxo-1,8-naphthyridine using 1,4-dihydro-7-isobutyl-4-oxo-1,8-naphthyridine.

EXAMPLE 7

7-n-Hexyl-1,4-dihydro-3-hydroxymethyl-4-oxo-1,8-naphthyridine using 7-n-hexyl-1,4-dihydro-4-oxo-1,8-naphthyridine.

EXAMPLE 8

7-Acetoxymethyl-1,4-dihydro-3-hydroxymethyl-4-oxo-1,8-naphthyridine using 7-acetoxymethyl-1,4-dihydro-4-oxo-1,8-naphthyridine.

EXAMPLE 9

1,4-Dihydro-3-hydroxymethyl-4-oxo-7-propionoxymethyl-1,8-naphthyridine using 1,4-dihydro-4-oxo-7-propionoxymethyl-1,8-naphthyridine.

EXAMPLE 10

1,4-Dihydro-3-hydroxymethyl-7-isobutyroxymethyl-4-oxo-1,8-naphthyridine using 1,4-dihydro-7-isobutyroxymethyl-4-oxo-1,8-naphthyridine.

EXAMPLE 11

7Hexanoyloxymethyl-1,4-dihydro-3-hydroxymethyl-4-oxo-1,8-naphthyridine using 7-hexanoyloxymethyl-1,4-dihydro-4-oxo-1,8-naphthyridine.

EXAMPLE 12

1,4-Dihydro-3-hydroxymethyl-4-oxo-7-(4-pyridyl)-1,8-naphthyridine using 1,4-dihydro-4-oxo-7-(4-pyridyl)-1,8-naphthyridine.

EXAMPLE 13

1,4-Dihydro-3-hydroxymethyl-4-oxo-7-(3-pyridyl)-1,8-naphthyridine using 1,4-dihydro-4-oxo-7-(3-pyridyl)-1,8-naphthyridine.

EXAMPLE 14

1,4-Dihydro-3-hydroxymethyl-7-(2-methyl-4-pyridyl)-4-oxo-1,8-naphthyridine using 1,4-dihydro-7-(2-methyl-4-pyridyl)-4-oxo-1,8-naphthyridine.

EXAMPLE 15

1,4Dihydro-3-hydroxymethyl-7-(3-methyl-4-pyridyl)-1,8-naphthyridine using 1,4-dihydro-7-(3-methyl-4-pyridyl)-4-oxo-1,8-naphthyridine.

EXAMPLE 16

7-(2-Ethyl-4-pyridyl)-1,4-dihydro-3-hydroxymethyl-4-oxo-1,8-naphthyridine using 7-(2ethyl-4-pyridyl)-1,4-dihydro-4-oxo-1,8-naphthyridine.

EXAMPLE 17

7-(3-Ethyl-4-pyridyl)-1,4-dihydro-3-hydroxymethyl-4-oxo-1,8-naphthyridine using 7-(3-ethyl-4-pyridyl)-1,4dihydro-4-oxo-1,8-naphthyridine.

EXAMPLE 18

1,4-Dihydro-3-hydroxymethyl-7-(2,6-dimethyl-4-pyridyl)-4-oxo-1,8-naphthyridine using 1,4-dihydro-7-(2,6-dimethyl-4-pyridyl)-4-oxo-1,8-naphthyridine.

EXAMPLE 19

1,4-Dihydro-3-hydroxymethyl-7-(3,5-dimethyl-4-pyridyl)-4-oxo-1,8-naphthyridine using 1,4-dihydro-7-(3,5-dimethyl-4-pyridyl)-4-oxo-1,8-naphthyridine.

Following the procedure described in Example 2 but using in place of 1,4-dihydro-3-hydroxymethyl-7-methyl-4-oxo-1,8-naphthyridine a molar equivalent quantity of the appropriate 1,4-dihydro-3-hydroxymethyl-4-oxo-7-Q-1,8-naphthyridine, the compounds of Examples 20-35 are obtained:

EXAMPLE 20

1,7-Diethyl-1,4-dihydro-3-hydroxymethyl-4-oxo-1,8-naphthyridine using 7-ethyl-1,4-dihydro-3-hydroxymethyl-4-oxo-naphthyridine. Similarly, using said 7-ethyl compound and a molar equivalent quantity of dimethyl sulfate, n-propyl iodide, isobutyl bromide or n-hexyl chloride in place of ethyl iodide, there is obtained 7ethyl-1,4-dihydro-3-hydroxymethyl-1-methyl-4-oxo-1,8-naphthyridine, 7-ethyl-1,4-dihydro-3-hydroxymethyl-4-oxo-1-n-propyl-1,8-naphthyridine, 7-ethyl-1,4-dihydro-3-hydroxy-methyl-1-isobutyl-4-oxo-1,8-naphthyridine or 7-ethyl-1-n-hexyl-1,4-dihydro-3-hydroxymethyl-4-oxo-1,8-naphthyridine, respectively.

EXAMPLE 21

1-Ethyl-1,4-dihydro-3-hydroxymethyl-4-oxo-7-n-propyl-1,8-naphthyridine using 1,4-dihydro-3-hydroxymethyl-4-oxo-7-n-propyl-1,8-naphthyridine.

EXAMPLE 22

1-Ethyl-1,4-dihydro-3-hydroxymethyl-7-isobutyl-4-oxo-1,8-naphthyridine using 1,4-dihydro-3-hydroxymethyl-7-isobutyl-4-oxo-1,8-naphthyridine.

EXAMPLE 23

1-Ethyl-7-n-hexyl-1,4-dihydro-3-hydroxymethyl-4-oxo-1,8-naphthyridine using 7-n-hexyl-1,4-dihydro-3-hydroxymethyl-4-oxo-1,8-naphthyridine.

EXAMPLE 24

7-Acetoxymethyl-1-ethyl-1,4-dihydro-3-hydroxymethyl-4-oxo-1,8-naphthyridine using 7-acetoxymethyl-1,4-dihydro-3-hydroxymethyl-4-oxo-1,8-naphthyridine. Similarly, using said 7-acetoxymethyl compound and a molar equivalent quantity of dimethyl sulfate, n-propyl iodide, isobutyl bromide or n-hexyl chloride in place of ethyl iodide, there is obtained 7-acetoxymethyl-1,4-dihydro-3-hydroxymethyl-1-methyl-4-oxo-1,8-naphthyridine, 7-acetoxymethyl-1,4-dihydro-3-hydroxymethyl-4-oxo-1-n-propyl-1,8-naphthyridine, 7-acetoxymethyl-1,4-dihydro-3-hydroxymethyl-1-isobutyl-4-oxo-1,8-naphthyridine or 7-acetoxymethyl-1-n-hexyl-1,4-dihydro-3-hydroxymethyl-4-oxo-1,8-naphthyridine, respectively.

EXAMPLE 25

1-Ethyl-1,4-dihydro-3-hydroxymethyl-4-oxo-7-propionoxymethyl-1,8-naphthyridine using 1,4-dihydro-3-hydroxymethyl-4-oxo-7-propionoxymethyl-1,8-naphthyridine.

EXAMPLE 26

1-Ethyl-1,4-dihydro-3-hydroxymethyl-7-isobutyroxymethyl-4-oxo-1,8-naphthyridine using 1,4-dihydro-3-hydroxymethyl-7-isobutyroxymethyl-4-oxo-1,8-naphthyridine.

EXAMPLE 27

1-Ethyl-7-hexanoyloxymethyl-1,4-dihydro-3-hydroxymethyl-4-oxo-1,8-naphthyridine using 7-hexanoyloxymethyl-1,4-dihydro-3-hydroxymethyl-4-oxo-1,8-naphthyridine.

EXAMPLE 28

1-Ethyl-1,4-dihydro-3-hydroxymethyl-4-oxo-7-(4-pyridyl)-1,8-naphthyridine using 1,4-dihydro-3-hydroxymethyl-4-oxo-7-(4-pyridyl)-1,8-naphthyridine. Similarly, using said 7-(4-pyridyl) compound and a molar equivalent quantity of dimethyl sulfate, n-propyl iodide, isobutyl bromide or n-hexyl chloride in place of ethyl iodide, there is obtained 1,4-dihydro-3-hydroxymethyl-1-methyl-4-oxo-7-(4-pyridyl)-1,8-naphthyridine, 1,4-dihydro-3-hydroxymethyl-4-oxo-1-n-propyl-7-(4-pyridyl)-1,8-naphthyridine, 1,4-dihydro-3-hydroxymethyl-1-isobutyl-4-oxo-7-(4-pyridyl)-1,8-naphthyridine or 1-n-hexyl-1,4-dihydro-3-hydroxymethyl-4-oxo-7-(4-pyridyl)-1,8-naphthyridine, respectively.

EXAMPLE 29

1-Ethyl-1,4-dihydro-3-hydroxymethyl-4-oxo-7-(3-pyridyl)-1,8-naphthyridine using 1,4-dihydro-3-hydroxymethyl-4-oxo-7-(3-pyridyl)-1,8-naphthyridine.

EXAMPLE 30

1-Ethyl-1,4-dihydro-3-hydroxymethyl-7-(2-methyl-4-pyridyl)-4-oxo-1,8-naphthyridine using 1,4-dihydro-3-hydroxymethyl-7-(2-methyl-4-pyridyl)-4-oxo-1,8-naphthyridine.

EXAMPLE 31

1-Ethyl-1,4-dihydro-3-hydroxymethyl-7-(3-methyl-4-pyridyl)-1,8-naphthyridine using 1,4-dihydro-3-hydroxymethyl-7-(3-methyl-4-pyridyl)-4-oxo-1,8-naphthyridine.

EXAMPLE 32

1-Ethyl-7-(2-ethyl-4-pyridyl)-1,4-dihydro-3-hydroxymethyl-4-oxo-1,8-naphthyridine using 7-(2-ethyl-4-pyridyl)-1,4-dihydro-3-hydroxymethyl-4-oxo-1,8-naphthyridine.

EXAMPLE 33

1-Ethyl-7-(3-ethyl-4-pyridyl)-1,4-dihydro-3-hydroxymethyl-4-oxo-1,8-naphthyridine using 7-(3-ethyl-4-pyridyl)-1,4-dihydro-3-hydroxymethyl-4-oxo-1,8-naphthyridine.

EXAMPLE 34

1-Ethyl-1,4-dihydro-3-hydroxymethyl-7-(2,6-dimethyl-4-pyridyl)-4-oxo-1,8-naphthyridine using 1,4-dihydro-3-hydroxymethyl-7-(2,6-dimethyl-4-pyridyl)-4-oxo-1,8-naphthyridine.

EXAMPLE 35

1-Ethyl-1,4-dihydro-3-hydroxymethyl-7-(3,5-dimethyl-4-pyridyl)-4-oxo-1,8-naphthyridine using 1,4-dihydro-3-hydroxymethyl-7-(3,5-dimethyl-4-pyridyl)-4-oxo-1,8-naphthyridine.

Following the procedure described in Example 3 but using a molar equivalent quantity of the appropriate 1-alkyl-1,4-dihydro-3-hydroxymethyl-4-oxo-7-Q-1,8-naphthyridine in place of 1-ethyl-1,4-dihydro-3-hydroxymethyl-7-methyl-4-oxo-1,8-naphthyridine, there are obtained the corresponding 1-alkyl-1,4-dihydro-4-oxo-7-Q-1,8-naphthyridine-3-carboxylic acids of Examples 36–63.

EXAMPLE 36

1,7-Diethyl-1,4-dihydro-4-oxo-1,8-naphthyridine-3-carboxylic acid using 1,7-diethyl-1,4-dihydro-3-hydroxymethyl-4-oxo-1,8-naphthyridine.

EXAMPLE 37

7-Ethyl-1,4-dihydro-1-methyl-4-oxo-1,8-naphthyridine-3-carboxylic acid using 7-ethyl-1,4-dihydro-3-hydroxymethyl-1-methyl-4-oxo-1,8-naphthyridine.

EXAMPLE 38

7-Ethyl-1,4-dihydro-4-oxo-1-n-propyl-1,8-naphthyridine-3-carboxylic acid using 7-ethyl-1,4-dihydro-3-hydroxymethyl-4-oxo-1-n-propyl-1,8-naphthyridine.

EXAMPLE 39

7-Ethyl-1,4-dihydro-1-isobutyl-4-oxo-1,8-naphthyridine-3-carboxylic acid usisng 7-ethyl-1,4-dihydro-3-hydroxymethyl-1-isobutyl-4-oxo-1,8-naphthyridine.

EXAMPLE 40

7-Ethyl-1-n-hexyl-1,4-dihydro-4-oxo-1,8-naphthyridine-3-carboxylic acid using 7-ethyl-1-n-hexyl-1,4-dihydro-3-hydroxymethyl-4-oxo-1,8-naphthyridine.

EXAMPLE 41

1-Ethyl-1,4-dihydro-4-oxo-7-n-propyl-1,8-naphthyridine-3-carboxylic acid using 1-ethyl-1,4-dihydro-3-hydroxymethyl-4-oxo-7-n-propyl-1,8-naphthyridine.

EXAMPLE 42

1-Ethyl-1,4-dihydro-7-isobutyl-4-oxo-1,8-naphthyridine-3-carboxylic acid using 1-ethyl-1,4-dihydro-3-hydroxymethyl-7-isobutyl-4-oxo-1,8-naphthyridine.

EXAMPLE 43

1-Ethyl-7-n-hexyl-1,4-dihydro-4-oxo-1,8-naphthyridine-3-carboxylic acid using 1-ethyl-7-n-hexyl-1,4-dihydro-3-hydroxymethyl-4-oxo-1,8-naphthyridine.

EXAMPLE 44

7-Acetoxymethyl-1,4-dihydro-1-methyl-4-oxo-1,8-naphthyridine-3-carboxylic acid using 7-acetoxymethyl-1,4-dihydro-3-hydroxymethyl-1-methyl-4-oxo-1,8-naphthyridine.

EXAMPLE 45

7-Acetoxymethyl-1,4-dihydro-4-oxo-1-n-propyl-1,8-naphthyridine-3-carboxylic acid using 7-acetoxymethyl-1,4-dihydro-3-hydroxymethyl-4-oxo-1-n-propyl-1,8-naphthyridine.

EXAMPLE 46

7-Acetoxymethyl-1,4-dihydro-1-isobutyl-4-oxo-1,8-naphthyridine-3-carboxylic acid using 7-acetoxymethyl-1,4-dihydro-3-hydroxymethyl-1-isobutyl-4-oxo-1,8-naphthyridine.

EXAMPLE 47

7-Acetoxymethyl-1-n-hexyl-1,4-dihydro-4-oxo-1,8-naphthyridine-3-carboxylic acid using 7-acetoxymethyl-1-n-hexyl-1,4-dihydro-3-hydroxymethyl-4-oxo-1,8-naphthyridine.

EXAMPLE 48

7-Acetoxymethyl-1-ethyl-1,4-dihydro-4-oxo-1,8-naphthyridine-3-carboxylic acid using 7-acetoxymethyl-1-ethyl-1,4-dihydro-3-hydroxymethyl-4-oxo-1,8-naphthyridine.

EXAMPLE 49

1-Ethyl-1,4-dihydro-4-oxo-7-propionoxymethyl-1,8-naphthyridine-3-carboxylic acid using 1-ethyl-1,4-dihydro-3-hydroxymethyl-4-oxo-7-propionoxymethyl-1,8-naphthyridine.

EXAMPLE 50

1-Ethyl-1,4-dihydro-7-isobutyroxymethyl-4-oxo-1,8-naphthyridine-3-carboxylic acid using 1-ethyl-1,4-dihydro-3-hydroxymethyl-7-isobutyroxymethyl-4-oxo-1,8-naphthyridine.

EXAMPLE 51

1-Ethyl-7-hexanoyloxymethyl-1,4-dihydro-4-oxo-1,8-naphthyridine-3-carboxylic acid using 1-ethyl-7-hexanoyloxymethyl-1,4-dihydro-3-hydroxymethyl-4-oxo-1,8-naphthyridine.

EXAMPLE 52

1-Ethyl-1,4-dihydro-4-oxo-7-(4-pyridyl)-1,8-naphthyridine-3-carboxylic acid using 1-ethyl-1,4-dihydro-3-hydroxymethyl-4-oxo-7-(4-pyridyl)-1,8-naphthyridine.

EXAMPLE 53

1,4-Dihydro-1-methyl-4-oxo-7-(4-pyridyl)-1,8-naphthyridine-3-carboxylic acid using 1,4-dihydro-3-hydroxymethyl-1-methyl-4-oxo-7-(4-pyridyl)-1,8-naphthyridine.

EXAMPLE 54

1,4-Dihydro-4-oxo-1-n-propyl-7-(4-pyridyl)-1,8-naphthyridine-3-carboxylic acid using 1,4-dihydro-3-hydoxymethyl-4-oxo-1-n-propyl-7-(4-pyridyl)-1,8-naphthyridine.

EXAMPLE 55

1,4-Dihydro-1-isobutyl-4-oxo-7-(4-pyridyl)-1,8-naphthyridine-3-carboxylic acid using 1,4-dihydro-3-hydroxymethyl-1-isobutyl-4-oxo-7-(4-pyridyl)-1,8-naphthyridine.

EXAMPLE 56

1-n-Hexyl-1,4-dihydro-4-oxo-7-(4-pyridyl)-1,8-naphthyridine-3-carboxylic acid using 1-n-hexyl-1,4-dihydro-3-hydroxymethyl-4-oxo-7-(4-pyridyl)-1,8-naphthyridine.

EXAMPLE 57

1-Ethyl-1,4-dihydro-4-oxo-7-(3-pyridyl)-1,8-naphthyridine-3-carboxylic acid using 1-ethyl-1,4-dihydro-3-hydroxymethyl-4-oxo-7-(3-pyridyl)-1,8-naphthyridine.

EXAMPLE 58

1-Ethyl-1,4-dihydro-7-(2-methyl-4-pyridyl)-4-oxo-1,8-naphthyridine-3-carboxylic acid using 1-ethyl-1,4-dihydro-3-hydroxymethyl-7-(2-methyl-4-pyridyl)-4-oxo-1,8-naphthyridine.

EXAMPLE 59

1-Ethyl-1,4-dihydro-7-(3-methyl-4-pyridyl)-1,8-naphthyridine-3-carboxylic acid using 1-ethyl-1,4-dihydro-3-hydroxymethyl-7-(3-methyl-4-pyridyl)-1,8-naphthyridine.

EXAMPLE 60

1-Ethyl-7-(2-ethyl-4-pyridyl)-1,4-dihydro-4-oxo-1,8-naphthyridine-3-carboxylic acid using 1-ethyl-7-(2-ethyl-4-pyridyl)-1,4-dihydro-3-hydroxymethyl-4-oxo-1,8-naphthyridine.

EXAMPLE 61

1-Ethyl-7-(3-ethyl-4-pyridyl)-1,4-dihydro-4-oxo-1,8-napthyridine-3-carboxylic acid using 1-ethyl-7-(3-ethyl-4-pyridyl)-1,4-dihydro-3-hydroxymethyl-4-oxo-1,8-naphthyridine.

EXAMPLE 62

1-Ethyl-1,4-dihydro-7-(2,6-dimethyl-4-pyridyl)-4-oxo-1,8-naphthyridine-3-carboxylic acid using 1-ethyl-1,4-dihydro-3-hydroxymethyl-7-(2,6-dimethyl-4-pyridyl)-4-oxo-1,8-naphthyridine.

EXAMPLE 63

1-Ethyl-1,4-dihydro-7-(3,5-dimethyl-4-pyridyl)-4-oxo-1,8-naphthyridine-3-carboxylic acid using 1-ethyl-1,4-dihydro-3-hydroxymethyl-7-(3,5-dimethyl-4-pyridyl)-4-oxo-1,8-naphthyridine.

The following Examples 64–110 illustrate the preparation of the intermediate 1,4-dihydro-4-oxo-7-Q-1,8-naphthyridines, said preparation being disclosed and claimed in copending U.S. Pat. application Ser. No. 335,733.

EXAMPLE 64

Cyclic isopropylidenyl N-(6-methyl-1-oxo-2-pyridyl) aminomethylenemalonate

To a solution containing 26.2 g. of cyclic isopropylidenyl N-(6-methyl-2-pyridyl)aminomethlenemalonate in 150 ml. of chloroform is slowly added with stirring 19 g. of 3-chloroperbenzoic acid, keeping the reaction temperature below about 40°C. After the addition is completed, the reaction mixture is heated on a steam bath for about 30 minutes. The reaction mixture is extracted successively with 50 ml. of ice cold 10% aqueous sodium bicarbonate solution, 70 ml. of water, 30 ml. of ice cold 10% aqueous sodium bicarbonate solution and 25 ml. of water. The resulting chloroform solution is washed with water, dried over anhydrous potassium carbonate, filtered and the filtrate concentrated in vacuo to remove the chloroform. The remaining solid is triturated with isopropyl alcohol and then recrystallized from ethanol using decolorizing charcoal to yield cyclic isopropylidenyl N-(6-methyl-1-oxo-2-pyridyl)aminomethylenemalonate, m.p. 222°–223°C. with decomposition.

The above preparation also is carried out using a molar equivalent quantity of other oxidizing agents in a suitable solvent inert under the reaction conditions, e.g., use of peracetic acid in acetic acid.

EXAMPLE 65

1,4-Dihydro-7-methyl-4-oxo-1,8-naphthyridine-8-oxide

To a 150 ml. portion of diethyl phthalate heated to 275°C. is added with stirring 2.78 g. of cyclic isopropylidenyl N-(6-methyl-1-oxo-2-pyridyl)aminomethylenemalonate. The stirred reaction mixture is heated at the same temperature for two minutes and then allowed to cool to room temperature. The precipitated solid is collected, washed well with ether and air-dried to yield the product, 1,4-dihydro-7-methyl-4-oxo-1,8-naphthyridine-8-oxide, which is tautomeric with 4-hydroxy-7-methyl-1,8-naphthyridine-8-oxide. Recrystallization, if desired, is carried out using dimethylformamide.

The above cyclization also is carried out in 225 ml. of refluxing Dowtherm A in place of the diethyl phthalate.

EXAMPLE 66

1,4-Dihydro-7-methyl-4-oxo-1,8-naphthyridine

A mixture containing 8.75 g. of 1,4-dihydro-7-methyl-4-oxo-1,8-naphthyridine-8-oxide, 250 ml. of absolute ethanol and 5 g. of Raney nickel is hydrogenated at about 25°C. in a Parr apparatus using an initial pressure of 55 p.s.i. of hydrogen. The catalyst is filtered off, the filtrate treated with decolorizing charcoal and filtered, and the filtrate concentrated in vacuo and chilled. The precipitate is collected, recrystallized from ethanol and dried over $P_2O_5$ at 25°C. overnight to yield 1,4-dihydro-7-methyl-4-oxo-1,8-naphthyridine, m.p. 240°–241°C.

Following the procedure described in Example 64 but using in place of cyclic isopropylidenyl N-(6-methyl-2-pyridyl)aminomethylenemalonate a molar equivalent quantity of the appropriate cyclic alkylidenyl N-(6-Q-2-pyridyl)aminomethylenemalonate, the compounds of Examples 67–81 are obtained:

EXAMPLE 67

Cyclic isopropylidenyl N-(6-ethyl-1-oxo-2-pyridyl)aminomethylenemalonate using cyclic isopropylidenyl N-(6-ethyl-2-pyridyl)aminomethylenemalonate, the latter prepared by reacting 2-amino-6-ethylpyridine with a mixture of triethyl orthoformate and cyclic isopropylidenyl malonate.

EXAMPLE 68

Cyclic isopropylidenyl N-(1-oxo-6-n-propyl-2-pyridyl)aminomethylenemalonate using cyclic isopropylidenyl N-(6-n-propyl-2-pyridyl)aminomethylenemalonate, the latter prepared by reacting 2-amino-6-n-propylpyridine with a mixture of triethyl orthoformate and cyclic isopropylidenyl malonate.

EXAMPLE 69

Cyclic isopropylidenyl N-(6-isopropyl-1-oxo-2-pyridyl)aminomethylenemalonate using cyclic isopropylidenyl N-(6-isopropyl-2-pyridyl)aminomethylenemalonate, the latter prepared by reacting 2-amino-6-isopropylpyridine with a mixture of triethyl orthoformate and cyclic isopropylidenyl malonate.

EXAMPLE 70

Cyclic isopropylidenyl N-(6-n-butyl-1-oxo-2-pyridyl)aminomethylenemalonate using cyclic isopropylidenyl N-(6-n-butyl-2-pyridyl)aminomethylenemalonate, the latter prepared by reacting 2-amino-6-n-butylpyridine with a mixture of triethyl orthoformate and cyclic isopropylidenyl malonate.

EXAMPLE 71

Cyclic isopropylidenyl N-(6-n-hexyl-1-oxo-2-pyridyl)aminomethylenemalonate using cyclic isopropylidenyl N-(6-n-hexyl-2-pyridyl)aminomethylenemalonate, the latter prepared by reacting 2-amino-6-n-hexylpyridine with a mixture of triethyl orthoformate and cyclic isopropylidenyl malonate.

EXAMPLE 72

Cyclic 3-pentylidenyl N-(6-methyl-1-oxo-2-pyridyl)aminomethylenemalonate using cyclic 3-pentylidenyl N-(6-methyl-2-pyridyl)aminomethylenemalonate, the latter prepared by reacting 2-amino-6-methylpyridine with a mixture of triethyl orthoformate and cyclic 3-pentylidenyl malonate.

EXAMPLE 73

Cyclic 2-butylidenyl N-(6-methyl-1-oxo-2-pyridyl)aminomethylenemalonate using cyclic 2-butylidenyl N-(6-methyl-2-pyridyl)aminomethylenemalonate, the latter prepared by reacting 2-amino-6-methylpyridine with a mixture of triethyl orthoformate and cyclic 2-butylidenyl malonate.

EXAMPLE 74

Cyclic 4-heptylidenyl N-(6-methyl-1-oxo-2-pyridyl)aminomethylenemalonate using cyclic 4-heptylidenyl N-(6-methyl-2-pyridyl)aminomethylenemalonate, the latter prepared by reacting 2-amino-6-methylpyridine with a mixture of triethyl orthoformate the cyclic 4-heptylidenyl malonate.

EXAMPLE 75

Cyclic isopropylidenyl N-[1-oxo-6-(1-oxo-4-pyridyl)-2-pyridyl]aminomethylenemalonate using cyclic isopropylidenyl N-[6-(4-pyridyl)-2-pyridyl]aminomethylenemalonate, the latter prepared by reacting 2-amino-6-(4-pyridyl)pyridine with a mixture of triethyl orthoformate and cyclic isopropylidenyl malonate.

EXAMPLE 76

Cyclic isopropylidenyl N-[1-oxo-6-(1-oxo-3-pyridyl)-2-pyridyl]aminomethylenemalonate using cyclic isopropylidenyl N-[6-(3-pyridyl)-2-pyridyl]aminomethylenemalonate, the latter prepared by reacting 2-amino-6-(3-pyridyl)pyridine with a mixture of triethyl orthoformate and cyclic isopropylidenyl malonate.

EXAMPLE 77

Cyclic isopropylidenyl N-[1-oxo-6-(2-methyl-1-oxo-4-pyridyl)-2-pyridyl]aminomethylenemalonate using cyclic isopropylidenyl N-[6-(2-methyl-4-pyridyl)-2-pyridyl]aminomethylenemalonate, the latter prepared by reacting 2-amino-6-(2-methyl-4-pyridyl)pyridine with a mixture of triethyl orthoformate and cyclic isopropylidenyl malonate.

EXAMPLE 78

Cyclic isopropylidenyl N-[1-oxo-6-(2-ethyl-1-oxo-4-pyridyl)-2-pyridyl]aminomethylenemalonate using cyclic isopropylidenyl N-[6-(2-ethyl-4-pyridyl)-2-pyridyl]aminomethylenemalonate, the latter prepared by reacting 2-amino-6-(2-ethyl-4-pyridyl)pyridine with a mixture of triethyl orthoformate and cyclic isopropylidenyl malonate.

EXAMPLE 79

Cyclic isopropylidenyl N-[1-oxo-6-(3-ethyl-1-oxo-4-pyridyl)-2-pyridyl]aminomethylenemalonate using cyclic isopropylidenyl N-[6-(3-ethyl-4-pyridyl)-2-pyridyl]aminomethylenemalonate, the latter prepared by reacting 2-amino-6-(3-ethyl-4-pyridyl)pyridine with a mixture of triethyl orthoformate and cyclic isopropylidenyl malonate.

EXAMPLE 80

Cyclic isopropylidenyl N-[1-oxo-6-(2,6-dimethyl-1-oxo-4-pyridyl)-2-pyridyl]aminomethylenemalonate using cyclic isopropylidenyl N-[6-(2,6-dimethyl-4-pyridyl)-2-pyridyl]aminomethylenemalonate, the latter prepared by reacting 2-amino-6-(2,6-dimethyl-4-pyridyl)pyridine with a mixture of triethyl orthoformate and cyclic isopropylidenyl malonate.

EXAMPLE 81

Cyclic isopropylidenyl N-[1-oxo-6-(3,5-dimethyl-1-oxo-4-pyridyl)-2-pyridyl]aminomethylenemalonate using cyclic isopropylidenyl N-[6-(3,5-dimethyl-4-pyridyl)-2-pyridyl]aminomethylenemalonate, the latter prepared by reacting 2-amino-6-(3,5-dimethyl-4-pyridyl)pyridine with a mixture of triethyl orthoformate and cyclic isopropylidenyl malonate.

Following the procedure described in Example 65 but using in place of cyclic isopropylidenyl N-(6-methyl-1-oxo-2-pyridyl)aminomethylenemalonate a molar equivalent quantity of the appropriate cyclic alkylidenyl N-(6-Q-1-oxo-2-pyridyl)aminomethylenemalonate, the compounds of Examples 82–97 are obtained:

EXAMPLE 82

7-Ethyl-1,4-dihydro-4-oxo-1,8-naphthyridine-8-oxide using cyclic isopropylidenyl N-(6-ethyl-1-oxo-2-pyridyl)aminomethylenemalonate.

EXAMPLE 83

1,4-Dihydro-4-oxo-7-n-propyl-1,8-naphthyridine-8-oxide using cyclic isopropylidenyl N-(1-oxo-6-n-propyl-2-pyridyl)aminomethylenemalonate.

EXAMPLE 84

1,4-Dihydro-7-isopropyl-4-oxo-1,8-naphthyridine-8-oxide using cyclic isopropylidenyl N-(6-isopropyl-1-oxo-2-pyridyl)aminomethylenemalonate.

EXAMPLE 85

7-n-Butyl-1,4-dihydro-4-oxo-1,8-naphthyridine-8-oxide using cyclic isopropylidenyl N-(6-n-butyl-1-oxo-2-pyridyl)aminomethylenemalonate.

EXAMPLE 86

7-n-Hexyl-1,4-dihydro-4-oxo-1,8-naphthyridine-8-oxide using cyclic isopropylidenyl N-(6-n-hexyl-1-oxo-2-pyridyl)aminomethylenemalonate.

EXAMPLE 87

1,4-Dihydro-7-methyl-4-oxo-1,8-naphthyridine-8-oxide using cyclic 3-pentylidenyl N-(6-methyl-1-oxo-2-pyridyl)aminomethylenemalonate.

EXAMPLE 88

1,4-Dihydro-7-methyl-4-oxo-1,8-naphthyridine-8-oxide using cyclic 2-butylidenyl N-(6-methyl-1-oxo-2-pyridyl)aminomethylenemalonate.

EXAMPLE 89

1,4-Dihydro-7-methyl-4-oxo-1,8-naphthyridine-8-oxide using cyclic 4-heptylidenyl N-(6-methyl-1-oxo-2-pyridyl)aminomethylenemalonate.

EXAMPLE 90

1,4-Dihydro-4-oxo-7-(1-oxo-4-pyridyl)-1,8-naphthyridine-8-oxide using cyclic isopropylidenyl N-[1-oxo-6-(1-oxo-4-pyridyl)-2-pyridyl]aminomethylenemalonate.

EXAMPLE 91

1,4-Dihydro-4-oxo-7-(1-oxo-3-pyridyl)-1,8-naphthyridine-8-oxide using cyclic isopropylidenyl N-[1-oxo-6-(1-oxo-3-pyridyl)-2-pyridyl]aminomethylenemalonate.

EXAMPLE 92

1,4-Dihydro-4-oxo-7-(2-methyl-1-oxo-4-pyridyl)-1,8-naphthyridine-8-oxide using cyclic isopropylidenyl N-[1-oxo-6-(2-methyl-1-oxo-4-pyridyl)-2-pyridyl]aminomethylenemalonate.

EXAMPLE 93

1,4-Dihydro-4-oxo-7-(3-methyl-1-oxo-4-pyridyl)-1,8-naphthyridine-8-oxide using cyclic isopropylidenyl N-[1-oxo-6-(3-methyl-1-oxo-4-pyridyl)-2-pyridyl]aminomethylenemalonate.

EXAMPLE 94

1,4-Dihydro-4-oxo-7-(2-ethyl-1-oxo-4-pyridyl)-1,8-naphthyridine-8-oxide using cyclic isopropylidenyl N-[1-oxo-6-(2-ethyl-1-oxo-4-pyridyl)-2-pyridyl]aminomethylenemalonate.

EXAMPLE 95

1,4-Dihydro-4-oxo-7-(3-ethyl-1-oxo-4-pyridyl)-1,8-naphthyridine-8-oxide using cyclic isopropylidenyl N-[1-oxo-6-(3-ethyl-1-oxo-4-pyridyl)-2-pyridyl]aminomethylenemalonate.

EXAMPLE 96

1,4-Dihydro-4-oxo-7-(2,6-dimethyl-1-oxo-4-pyridyl)-1,8-naphthyridine-8-oxide using cyclic isopropylidenyl N-[1-oxo-6-(2,6-dimethyl-1-oxo-4-pyridyl)-2-pyridyl]aminomethylenemalonate.

EXAMPLE 97

1,4-Dihydro-4-oxo-7-(3,5-dimethyl-1-oxo-4-pyridyl)-1,8-naphthyridine-8-oxide using cyclic isopropylidenyl N-[1-oxo-6-(3,5-dimethyl-1-oxo-4-pyridyl)-2-pyridyl]aminomethylenemalonate.

Following the procedure described in Example 66, but using in place of 1,4-dihydro-7-methyl-4-oxo-1,8-naphthyridine-8-oxide a molar equivalent quantity of the appropriate 1,4-dihydro-7-Q-4-oxo-1,8-naphthyridine-8-oxide, the compounds of Examples 98–110 are produced:

EXAMPLE 98

7-Ethyl-1,4-dihydro-4-oxo-1,8-naphthyridine using 7-ethyl-1,4-dihydro-4-oxo-1,8-naphthyridine-8-oxide.

EXAMPLE 99

1,4-Dihydro-4-oxo-7-n-propyl-1,8-naphthyridine using 1,4-dihydro-4-oxo-7-n-propyl-1,8-naphthyridine-8-oxide.

EXAMPLE 100

1,4-Dihydro-7-isopropyl-4-oxo-1,8-naphthyridine using 1,4-dihydro-7-isopropyl-4-oxo-1,8-naphthyridine-8-oxide.

EXAMPLE 101

7-n-Butyl-1,4-dihydro-4-oxo-1,8-naphthyridine using 7-n-butyl-1,4-dihydro-4-oxo-1,8-naphthyridine-8-oxide.

EXAMPLE 102

7-n-Hexyl-1,4-dihydro-4-oxo-1,8-naphthyridine using 7-n-hexyl-1,4-dihydro-4-oxo-1,8-naphthyridine-8-oxide.

EXAMPLE 103

1,4-Dihydro-4-oxo-7-(4-pyridyl)-1,8-naphthyridine using 1,4-dihydro-4-oxo-7-(1-oxo-4-pyridyl)-1,8-naphthyridine-8-oxide.

EXAMPLE 104

1,4-Dihydro-4-oxo-7-(3-pyridyl)-1,8-naphthyridine using 1,4-dihydro-4-oxo-7-(1-oxo-3-pyridyl)-1,8-naphthyridine-8-oxide.

EXAMPLE 105

1,4-Dihydro-4-oxo-7-(2-methyl-4-pyridyl)-1,8-naphthyridine using 1,4-dihydro-4-oxo-7-(2-methyl-1-oxo-4-pyridyl)-1,8-naphthyridine-8-oxide.

EXAMPLE 106

1,4-Dihydro-4-oxo-7-(3-methyl-4-pyridyl)-1,8-naphthyridine using 1,4-dihydro-4-oxo-7-(3-methyl-1-oxo-4-pyridyl)-1,8-naphthyridine-8-oxide.

EXAMPLE 107

1,4-Dihydro-4-oxo-7-(2-ethyl-4-pyridyl)-1,8-naphthyridine using 1,4-dihydro-4-oxo-7-(2-ethyl-1-oxo-4-pyridyl)-1,8-naphthyridine-8-oxide.

EXAMPLE 108

1,4-Dihydro-4-oxo-7-(3-ethyl-4-pyridyl)-1,8-naphthyridine using 1,4-dihydro-4-oxo-7-(3-ethyl-1-oxo-4-pyridyl)-1,8-naphthyridine-8-oxide.

EXAMPLE 109

1,4-Dihydro-4-oxo-7-(2,6-dimethyl-4-pyridyl)-1,8-naphthyridine using 1,4-dihydro-4-oxo-7-(2,6-dimethyl-1-oxo-4-pyridyl)-1,8-naphthyridine-8-oxide.

EXAMPLE 110

1,4-Dihydro-4-oxo-7-(3,5-dimethyl-4-pyridyl)-1,8-naphthyridine using 1,4-dihydro-4-oxo-7-(3,5-dimethyl-1-oxo-4-pyridyl)-1,8-naphthyridine-8-oxide.

We claim:

1. The process consisting of reacting 1,4-dihydro-4-oxo-7-Q-1,8-naphthyridine with aqueous formaldehyde under alkaline conditions to produce, 1,4-dihydro-3-hydroxymethyl-4-oxo-7-Q-1,8-naphthyridine, reacting the latter with a lower-alkylating agent to produce 1-(lower-alkyl)-1,4-dihydro-3-hydroxymethyl-4-oxo-7-Q-1,8-naphthyridine, and reacting said 1-(lower-alkyl)-3-hydroxymethyl compound with an oxidizing agent capable of converting —CH$_2$OH to —COOH to produce 1-(lower-alkyl)-1,4-dihydro-4-oxo-7-Q-1,8-naphthyridine-3-carboxylic acid, where Q is lower-alkyl, lower-alkanoyloxymethyl, 4(or 3)-pyridyl or 4(or 3)-pyridyl having one or two lower-alkyl substituents.

2. The process consisting of reacting 1,4-dihydro-4-oxo-7-Q-1,8-naphthyridine with aqueous formaldehyde under alkaline conditions to produce 1,4-dihydro-3-hydroxymethyl-4-oxo-7-Q-1,8-naphthyridine, where Q is lower-alkyl, lower alkanoyloxymethyl, 4(or 3)-pyridyl or 4(or 3)-pyridyl having one or two lower-alkyl substituents.

3. The process consisting of reacting 1,4-dihydro-4-oxo-7-Q-1,8-naphthyridine with aqueous formaldehyde under alkaline conditions to produce 1,4-dihydro-3-hydroxymethyl-4-oxo-7-Q-1,8-naphthyridine and reacting 1,4-dihydro-3-hydroxymethyl-4-oxo-7-Q-1,8-naphthyridine with a lower-alkylating agent to produce 1-(lower-alkyl)-1,4-dihydro-3-hydroxymethyl-4-oxo-7-Q-1,8-naphthyridine, where Q is lower-alkyl, lower-alkanoyloxymethyl, 4(or 3)-pyridyl or 4(or 3)-pyridyl having one or two lower-alkyl substituents.

4. A compound selected from 1,4-dihydro-3-hydroxymethyl-4-oxo-7-Q-1,8-naphthyridine and its tautomeric 4-hydroxy-3-hydroxymethyl-7-Q-1,8-naphthyridine, where Q is lower-alkyl, lower-alkanoyloxymethyl, 4(or 3)-pyridyl or 4(or 3)-pyridyl having one or two lower-alkyl substituents.

5. The compound according to claim 4 where Q is methyl.

6. 1-(Lower-alkyl)-1,4-dihydro-3-hydroxymethyl-4-oxo-7-Q-1,8-naphthyridine, where Q is lower-alkyl, lower-alkanoyloxymethyl, 4(or 3)-pyridyl or 4(or 3)-pyridyl having one or two lower-alkyl substituents.

7. The compound according to claim 6 where Q is methyl.

8. The process according to claim 1 where Q is methyl and the lower-alkylating agent is an ethylating agent to produce 1-ethyl-1,4-dihydro-7-methyl-4-oxo-1,8-naphthyridine-3-carboxylic acid.

9. The process according to claim 2 where Q is methyl.

10. The process according to claim 3 where Q is methyl and the lower-alkylating agent is an ethylating agent.

11. The process consisting of reacting 1,4-dihydro-7-methyl-4-oxo-1,8-naphthyridine-8-oxide with aqueous formaldehyde under alkaline conditions to produce 1,4-dihydro-3-hydroxymethyl-7-methyl-4-oxo-1,8-naphthyridine-8-oxide and reacting the latter with an oxidizing agent capable of converting —CH$_2$OH to —COOH to produce 3-carboxy-1,4-dihydro-7-methyl-4-oxo-1,8-naphthyridine-8-oxide.

12. The process consisting of reacting 1,4-dihydro-7-methyl-4-oxo-1,8-naphthyridine-8-oxide with aqueous formaldehyde under alkaline conditions to produce 1,4-dihydro-3-hydroxymethyl-7-methyl-4-oxo-1,8-naphthyridine-8-oxide.

\* \* \* \* \*

UNITED STATES PATENT OFFICE
CERTIFICATE OF CORRECTION

Patent No. 3,869,464   Dated March 4, 1975

Inventor(s) George Y. Lesher and Monte D. Gruett

It is certified that error appears in the above-identified patent and that said Letters Patent are hereby corrected as shown below:

Abstract, line 6, change "al-" to read -- alkyl)- --; and, line 7, omit ")-".

Abstract, line 20, add -- 1,4- --, and line 21, omit the "-" before "dihydro".

Column 1, title, line 4, "-3HYDROXYMETHYL" should read -- 3-HYDROXYMETHYL --.

Column 1, line 6, omit "PROCESS AND INTERMEDIATES".

Column 1, line 36, "7Q" should read -- 7-Q --.

Column 2, line 64, between "4-" and "1,8" insert -- oxo- --.

Column 3, line 23, "4-(or 3)" should read -- 4(or 3) --.

Column 3, line 50, "7-1,8" should read -- 7-Q-1,8 --.

Column 3, line 52, "product" should read -- produce --.

Column 17, Claim 1, line 49, immediately following "produce" delete the comma.

Column 17, Claim 1, line 56, "...cude" should read -- ...duce --.

Signed and sealed this 1st day of July 1975.

(SEAL)
Attest:

RUTH C. MASON
Attesting Officer

C. MARSHALL DANN
Commissioner of Patents
and Trademarks